W. G. AND O. R. HUMPHREYS.
POWER TRANSMISSION GEARING.
APPLICATION FILED DEC. 17, 1920. RENEWED APR. 8, 1922.

1,419,383.

Patented June 13, 1922.
2 SHEETS—SHEET 1.

W. G. AND O. R. HUMPHREYS.
POWER TRANSMISSION GEARING.
APPLICATION FILED DEC. 17, 1920. RENEWED APR. 8, 1922.

1,419,383.

Patented June 13, 1922.
2 SHEETS—SHEET 2.

Inventors.
W. G. Humphreys.
AND
O. R. Humphreys.
By Arthur H. Sturges.
Attorney

UNITED STATES PATENT OFFICE.

WALTER G. HUMPHREYS AND OMAR R. HUMPHREYS, OF OMAHA, NEBRASKA.

POWER-TRANSMISSION GEARING.

1,419,383.  Specification of Letters Patent.  Patented June 13, 1922.

Application filed December 17, 1920, Serial No. 431,363. Renewed April 8, 1922. Serial No. 550,790.

*To all whom it may concern:*

Be it known that we, WALTER G. HUMPHREYS and OMAR R. HUMPHREYS, citizens of the United States, residing at Omaha, in the county of Douglas and State of Nebraska, have invented certain new and useful Improvements in Power-Transmission Gearing, of which the following is a specification.

The present invention relates to power transmission gearing, and more particularly to a driving mechanism adapted for use in machines of the character of ditching machines, tractors, and the like.

An object of the present invention is to provide a power transmission mechanism which embodies driving features for actuating mechanism and driving features for propelling devices; the propelling features being adjustable for varying the speed of travel of a machine incident to the use and non-use of the operating devices.

Another object of the present invention is to provide power transmission mechanism which insures the operation of desired mechanisms at a constant speed relatively to the prime mover, and which embodies propelling features which are adjustable independently of the speed of the mechanisms driven and deriving power from the same prime mover.

A further object of this invention is to provide a transmission mechanism for a ditching machine wherein one motor is employed and wherein the machine may be propelled from the motor independently of the driving of the operating mechanism of the machine from the same motor, the connections being novel and efficient and being relatively simplified as compared with prior devices in this art.

A still further object of the invention is to provide an improved transmission mechanism which is adapted particularly for use in the trench digging machine disclosed in application, Serial Number 403,717, filed August 16, 1920, by the present inventors.

With the foregoing and other objects in view, the invention will be more fully described hereinafter, and will be more particularly pointed out in the claims appended hereto.

In the drawings, wherein like symbols refer to like or corresponding parts throughout the several views, Fig. 1 is a fragmentary top plan view of the forward end of a machine constructed according to the present invention, certain parts being shown diagrammatically in position and other parts being broken away for illustrating the present novel features;

Figure 1:
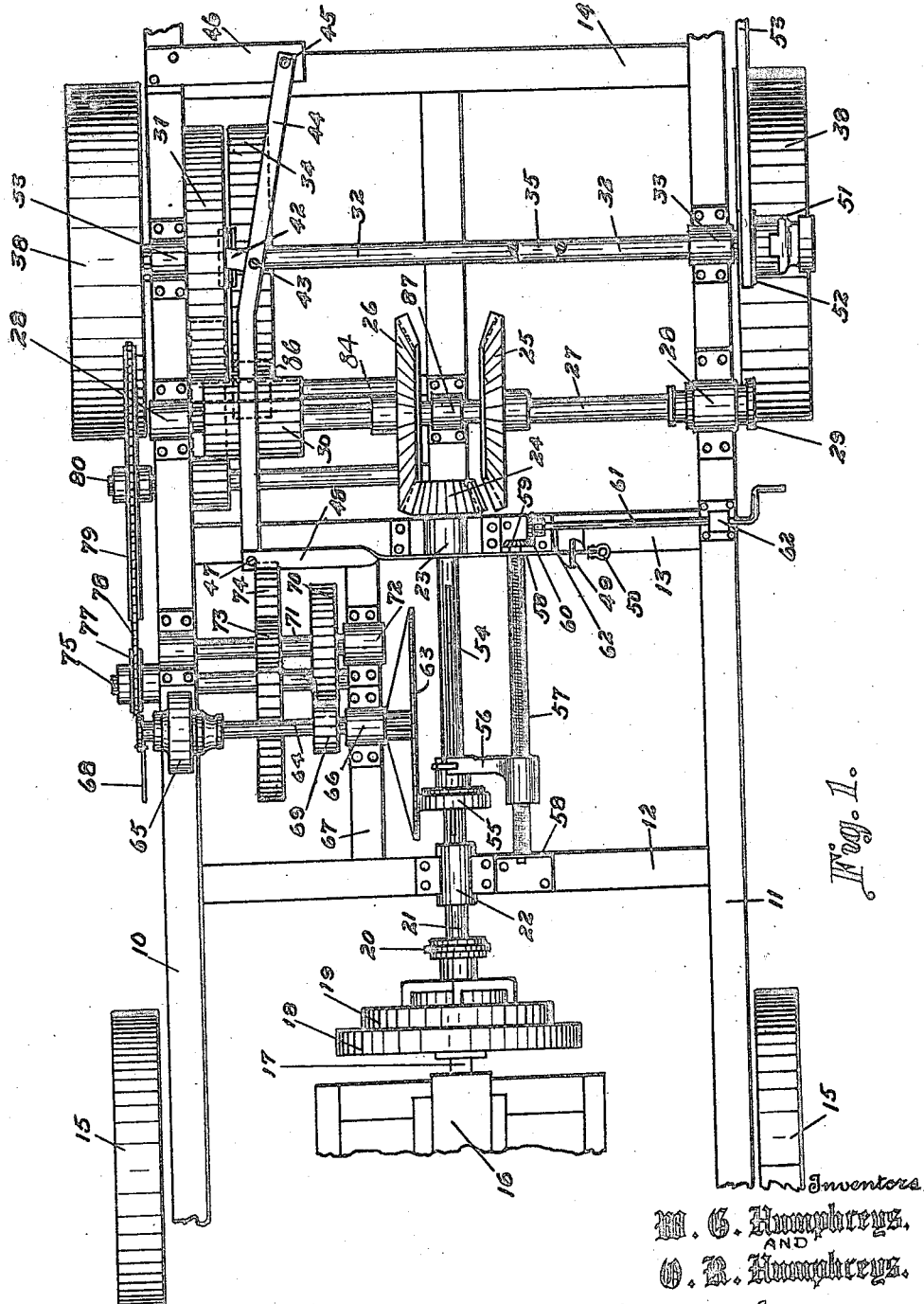
Figure 2:
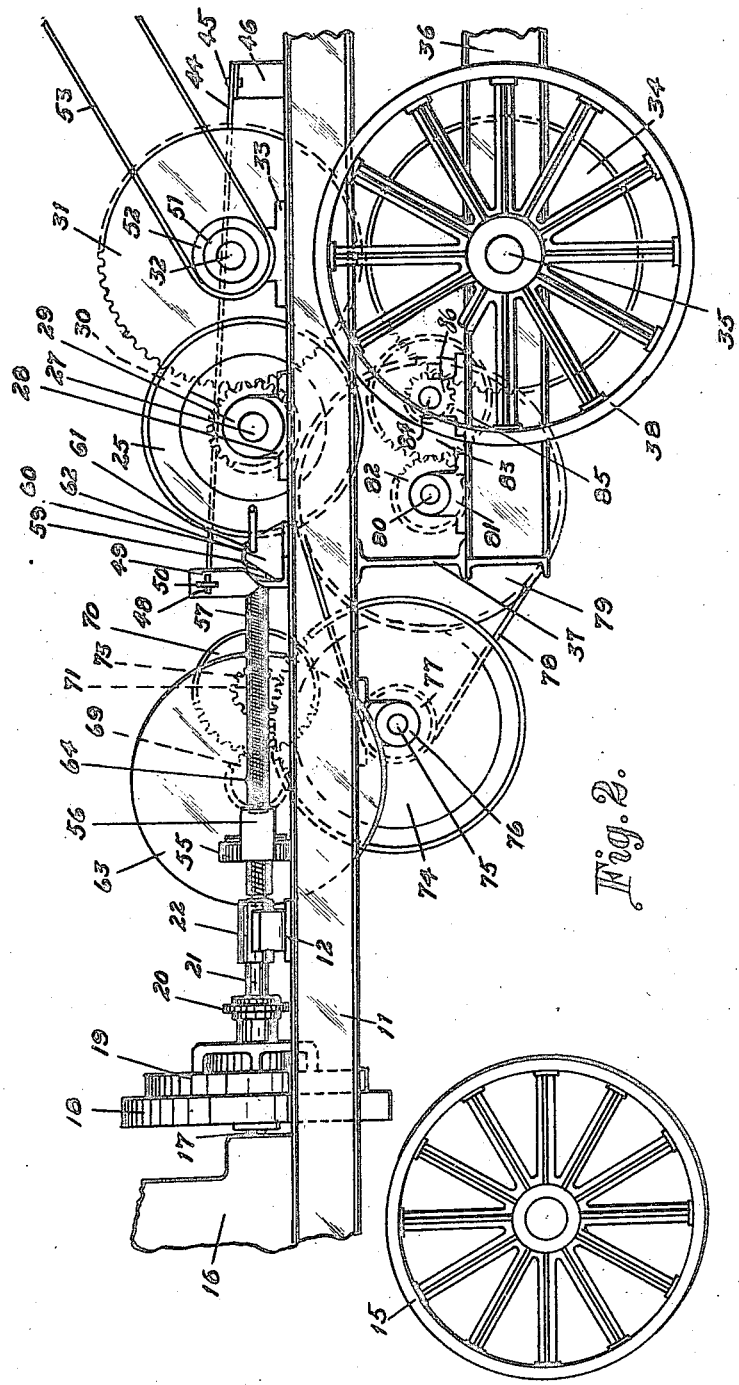
Fig. 2 is a side elevation of the same.

Referring to the drawings, 10 and 11 designate the side bars of the main frame which may be of any suitable length to adapt the device to machines of different types. The side bars 10 and 11 are connected together by cross braces 12, 13 and 14 suitably spaced apart and secured at opposite ends to the side bars to form therewith a rigid frame. The forward end of this frame is supported upon wheels 15 mounted in any suitable manner beneath the frame, and a motor 16 of any approved type is arranged in the forward end of the frame.

The motor 16 is provided with a crank or drive shaft 17 upon which is mounted a fly wheel 18 forming one member of a clutch, the other member 19 of the clutch having a coupling 20 joining a line shaft 21 to the crank shaft 17. The shaft 21 is supported in pillow blocks or bearings 22 and 23 mounted respectively upon the cross braces 12 and 13, and the shaft 21 has upon its rear end a pinion 24 arranged to selectively mesh with either one of a pair of correspondingly beveled gear wheels 25 and 26. The gear wheels 25 and 26 are fixed upon a transverse shaft 27 journaled near opposite ends in bearings or pillow blocks 28 mounted upon the upper sides of the side bars 10 and 11 of the frame.

The shaft 27 is adapted to be shifted longitudinally through the bearings 28 to selectively engage the gear wheels 25 and 26 with the pinion 24, and for this purpose a bushing or collar 29 is mounted upon one end of the shaft 27 at one side of the frame for easy access with a suitable implement for shifting the shaft 27. The shaft 27 carries in one side of the frame, preferably near the side bar 10, a relatively wide pinion 30 which at all times meshes with a large gear wheel 31 slidably keyed upon a transverse shaft 32 having bearing at opposite ends in pillow blocks 33 mounted upon the upper sides of the bars 10 and 11.

The gear wheel 31 is adapted to be shifted into and out of engagement with a second large gear wheel 34 fixed upon a driven shaft 35 which is journaled in the forward end to a sub-frame 36 arranged beneath the rear end portion of the main frame and connected thereto by a bolster 37 of preferably I-beam construction. The shaft 35 carries on opposite ends traction propelling members 38, shown in the present instance as wheels, which are fixed to the shaft 35 and adapted for use in propelling the machine in either direction.

The above described mechanism is used for propelling the machine either forwardly or rearwardly at a relatively high rate of speed, and is used particularly when other mechanisms, subsequently to be described, are adjusted out of operation.

Figure 3:
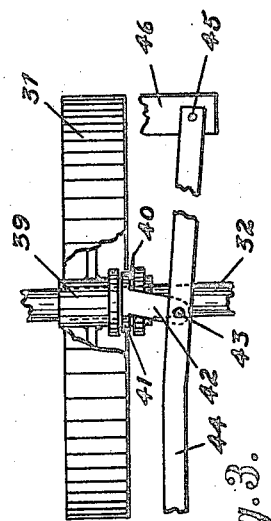
Fig. 3 is a detail fragmentary view of one of the gear shifting devices.

The gear wheel 31, as best shown in Fig. 3, is provided with a hub portion 39 with an annular groove 40 in one end into which engages the arm of a fork 41 on the end of a link 42, the link 42 being pivoted at 43 to a shifting lever 44 which is arranged at the inner side of the gear wheel 31. The rear end of the shifting lever 44 is pivoted at 45 to a bracket arm 46 which is secured to the adjacent side bar 10 of the frame. The lever 44 extends forwardly to the cross brace 13 and is pivoted at 47 to a sliding bar 48 mounted in a bracket 49 and provided upon its free end with a finger hold 50.

The bar 48 is preferably twisted intermediate its ends and frictionally engages through the bracket 49 for yieldingly holding the bar from vibrating and in its opposite positions of adjustment. It is apparent that the bar 48 may be slid longitudinally for swinging the shifting lever 44 in opposite directions to move the gear wheel 31 into and out of engagement with the gear wheel 34.

When the traction wheels 38 are not to be driven at the high rate of speed, the gear wheel 31 is shifted into position out of engagement with the gear wheel 34 so that the gear wheel 31 may freely rotate. The shaft 32 is provided at one side of the frame, preferably beyond the side bar 11, with a releasable clutch 51 upon one member of which is mounted a small sprocket wheel 52 over which passes a drive chain 53 conventionally shown, and which extends to any suitable mechanism to be operated, such as the mechanism of the ditching machine above referred to.

When the drive chain 53 is operated, it is necessary to propel the machine at a relatively slow rate of speed, and for accomplishing this result the following mechanism is provided.

The line shaft 21 is provided, between the braces 12 and 13, with a relatively long spline or feather 54 with which engages a slidable friction wheel 55, the latter being relatively small and connected to a traveling arm 56 threaded upon a screw shaft 57 journaled at opposite ends in brackets 58 upstanding from the cross braces 12 and 13. One end of the shaft 57 has a beveled gear 59 thereon which meshes with a second beveled gear 60 carried upon a crank shaft 61 which is mounted in bearings 62 on the cross brace 13, and which has its crank portion arranged outwardly of the side bar 11 for easy access to permit the operator to turn the shaft 61 and shift the propelling arm along the shaft 57. The friction wheel 55 bears against a large friction disc 63 carried upon the inner end of a transverse shaft 64 mounted in a thrust bearing 65 carried by the side bar 10 and in a second bearing 66 supported on a brace 67 extending between the cross braces 12 and 13 and at one side of the line shaft 21. The thrust bearing 65 may be of the releasable type and provided with a handle 68 for releasing pressure against the shaft 64 for spacing the friction disc 63 from the friction wheel 55.

The shaft 64 carries the pinion 69 which meshes with a gear wheel 70 mounted on a shaft 71 which is journaled in bearings 72 located on the side bar 10 on the brace bar 67. The shaft 71 is also provided with a pinion 73 which meshes with a second gear wheel 74 mounted upon a transverse shaft 75 journaled in hangers 76 suspended from the side bar 10 and the brace 67.

The outer end of the shaft 75, beyond the side bar 10, is provided with a small sprocket wheel 77 over which is trained a chain 78 which passes over a relatively large sprocket wheel 79 mounted on a transverse shaft 80. The shaft 80 is journaled in brackets 81 which rise from the sub-frame 36 and carries a pinion 82 which meshes with a larger gear wheel 83 mounted on a shaft 84 which is also journaled in brackets 85 rising from the sub-frame 36. The shaft 84 carries a pinion 86 which meshes with the relatively large gear wheel 34 carried upon the driven shaft 35 for rotating the traction wheels 38 through the above described train of gears.

In operation, when it is desired to propel the machine from place to place at a relatively high rate of speed, the small friction wheel 55 is adjusted lengthwise of the line shaft 21 into a dead center position with respect to the friction disc 63, and the shifting lever 44 is moved into position for intermeshing the gear wheels 31 and 34. The clutch 19, 20 may be released in any suitable manner, not shown, when the motor 16 is started. It will thus be seen that the traction wheels 38 will be driven directly through the line shaft 21 and gears 24, 26, 30, and 31 and 34. When, however, it is desired to bring into operation the mechanism carried by the machine and which may be driven through the belt 53 the gear wheel 31 is moved into position out of mesh with the gear wheel 34 so that the shaft 32 is driven for the sole purpose of operating the chain or belt 53.

To propel the machine while the mechanism is being operated, the friction wheel 55 is moved to either side of the axis of the friction disc 63 to effect a forward or rearward movement of the machine. It will be apparent that when the wheel 55 is in the position shown in Fig. 1 that the machine will be driven in a forward direction through the train of gears above described, the sprocket chain 78 and the other gears each meshing directly and at all times with the large gear 34 carried upon the driven shaft or axle 35.

When the machine is driven at the higher speed, the position of the shaft 27 regulates the forward or backward travel of the machine as the shaft 27 in being shifted by its collar or bushing 29, selectively engages the gear wheels 25 and 26 with the pinion 24.

It is also evident from the above that, when the mechanism of the machine is being operated by the belt 53, the travel of the machine in either direction may be regulated to different speeds irrespective of the constant speed of the mechanism connected to the belt 53. The belt 53 may be drawn out of operation if desired by shifting the clutch 51.

To strengthen the frame, and to hold the transverse shaft 27 from vibrating intermediate its ends, a longitudinal brace bar 86 is secured between the cross braces 13 and 14 and carries a bearing 87 located between the bevel gears 25 and 26 for supporting the shaft 27.

We do not wish to be restricted to the size, form, and proportions of the various parts, and obviously changes could be made in the construction herein described without departing from the spirit of the invention, it being only necessary that such changes fall within the scope of the appended claims.

What is claimed is:—

1. In transmission mechanism, a frame, a motor mounted in the frame, a line shaft journaled in the frame, a propeller shaft arranged beneath the frame, gears connecting the rear end of the line shaft to the propeller shaft and including a releasable element whereby the gears may be driven independently of the propeller shaft, operating mechanism, a connection for driving said operating mechanism connected to said gears for operation independently of the propeller shaft, a train of gears mounted on said frame, a friction disc connected to said train of gears, a friction wheel adjustably mounted on the line shaft for contact with said disc, said train of gears having connection with said propeller shaft, and means for adjusting said friction wheel relatively to said friction disc for driving the train of gears in different directions and at different speeds from said line shaft.

2. In transmission mechanism, the combination of a frame, a motor in the frame, a line shaft in the frame connected to the motor, two independent sets of transmission gears connected to the line shaft, a propeller shaft permanently connected to one set of gears, shiftable means for selectively connecting the other set of gears to the propeller shaft, adjustable means for said first set of gears for effecting variable speed transmissions therethrough and including a neutral position for adjustment during connection of the propeller shaft with the second set of transmission gears, and a driving connection for said second set of transmission gears for operating a mechanism independently of the driving of the propeller shaft.

3. In transmission mechanism, a driven shaft, a motor and two independent sets of transmission gears between the motor and the driven shaft, each of said sets of gears being adapted to selectively drive the driven shaft in opposite directions and each of said sets of gears having means for selectively and independently disengaging the sets of gears from the driven shaft.

4. In transmission mechanism, a driven shaft, a motor, and two independent sets of gears between the motor and driven shaft, one set of gears having a positive high speed reversible connection therein, and the other set of gears having a variable and reversible friction connection therein, both of said sets of gears being adapted to be selectively adjusted into inoperative position.

In testimony whereof, we have affixed our signatures in presence of two witnesses.

WALTER G. HUMPHREYS.
OMAR R. HUMPHREYS.

Witnesses:
   ARTHUR H. STURGES,
   E. B. MORRIS.